(12) United States Patent
Mizuno et al.

(10) Patent No.: US 9,920,816 B2
(45) Date of Patent: *Mar. 20, 2018

(54) VEHICLE TRANSMISSION

(71) Applicant: HONDA MOTOR CO., LTD., Tokyo (JP)

(72) Inventors: Kinya Mizuno, Wako (JP); Yasushi Fujimoto, Wako (JP); Eiji Kittaka, Wako (JP); Hiroyuki Makita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 336 days.

This patent is subject to a terminal disclaimer.

(21) Appl. No.: 14/825,770

(22) Filed: Aug. 13, 2015

(65) Prior Publication Data
US 2016/0053861 A1 Feb. 25, 2016

(30) Foreign Application Priority Data
Aug. 25, 2014 (JP) .................................. 2014-170285

(51) Int. Cl.
| | | |
|---|---|---|
| *F16H 3/00* | (2006.01) | |
| *F16H 37/02* | (2006.01) | |
| *F16H 3/089* | (2006.01) | |
| *F16H 3/08* | (2006.01) | |

(52) U.S. Cl.
CPC ............ *F16H 3/006* (2013.01); *F16H 3/089* (2013.01); *F16H 37/027* (2013.01); *F16H 2003/0822* (2013.01); *F16H 2200/0056* (2013.01)

(58) Field of Classification Search
CPC .......... F16H 3/006; F16H 3/089; F16H 37/027
USPC ............................................................ 74/330
See application file for complete search history.

(56) References Cited

U.S. PATENT DOCUMENTS

| | | | | |
|---|---|---|---|---|
| 2007/0062318 A1* | 3/2007 | Chang | ..................... | F16H 3/089 74/325 |
| 2011/0011194 A1* | 1/2011 | Gadre | ..................... | F16H 3/006 74/339 |
| 2015/0276033 A1* | 10/2015 | Mizuno | ................... | B62M 9/00 74/325 |
| 2016/0053861 A1* | 2/2016 | Mizuno | ................... | F16H 3/089 74/665 K |

FOREIGN PATENT DOCUMENTS

| | | |
|---|---|---|
| JP | 2014-072612 | 4/2014 |
| JP | 2015-194213 | 11/2015 |

\* cited by examiner

*Primary Examiner* — William C Joyce
(74) *Attorney, Agent, or Firm* — Rankin, Hill & Clark LLP

(57) ABSTRACT

A transmission that reduces the difference of rotational speed when engaging a main shaft-side sprocket and a main shaft-outer shaft, in a low-speed traveling mode. When shifting from first gear to neutral in the transmission, a dog on a drive gear is engaged with a dog hole in a main shaft-side sprocket, engagement between a dog on a driven gear for first gear and a dog hole in a driven gear is released, and then a first clutch and a second clutch are disconnected with the drive gear and the main shaft-side sprocket being engaged.

8 Claims, 6 Drawing Sheets

VEHICLE TRANSMISSION

BACKGROUND OF THE INVENTION

Field of the Invention

The present invention relates to a vehicle transmission mounted on a vehicle that moves forward and rearward.

Description of Related Art

Heretofore, there has been known a vehicle that can carry out a low-speed traveling mode where the vehicle is moved forward or rearward at low speed, in addition to a normal traveling mode. In the low-speed traveling mode, the vehicle can be moved forward and rearward with a simple operation of a controller.

In Japanese Patent Application No. 2014-72612, the applicant has proposed a vehicle equipped with DCT (Dual Clutch Transmission) having a main shaft provided with a train of multiple drive gears, and a counter shaft provided with a train of multiple driven gears meshing with the train of drive gears. The main shaft and the counter shaft are arranged parallel to each other.

A main shaft-side sprocket and a counter shaft-side sprocket are respectively provided on the main shaft and the counter shaft in a relatively rotatable manner, and a reverse travel chain is wound around the sprockets.

The main shaft is configured of a main shaft-inner shaft including the main shaft-side sprocket, and a main shaft-outer shaft arranged coaxially with and radially outward of the main shaft-inner shaft. The main shaft-outer shaft can rotate integrally with or separate from the main shaft-side sprocket arranged on the main shaft-inner shaft. Additionally, a first clutch and a second clutch, which connect and disconnect an engine and a transmission, are provided respectively on one end sides of the main shaft-inner shaft and the main shaft-outer shaft.

In the above-described vehicle transmission, the vehicle cannot move forward or rearward if it is in the neutral state, i.e., if the clutches are disconnected. However, since there is residual oil in the clutches, clutch capacity is generated by the residual oil even when the clutches are disconnected. Hence, the clutches are connected spuriously, so that the main shaft-inner shaft and the main shaft-outer shaft may be rotated slightly by an output-side plate.

As a result, when each of the main shaft-inner shaft and the main shaft-outer shaft is rotating at 1000 rpm, for example, rotation of the main shaft-inner shaft is transmitted in the order of: the main shaft-inner shaft, drive gear for first gear, driven gear for first gear, counter shaft-side sprocket, reverse travel chain, and main shaft-side sprocket. In this case, if the gear ratio between the drive gear for first gear and the driven gear for first gear is 2, and the gear ratio between the sprockets is 1, the main shaft-side sprocket rotates at 500 rpm in the opposite direction of the main shaft-inner shaft and main shaft-outer shaft (−500 rpm).

That is, the difference of rotational speed between the main shaft-side sprocket, and the main shaft-inner shaft and main shaft-outer shaft is 1500 rpm (1000 rpm−(−500 rpm)=1500 rpm).

Accordingly, if the vehicle is to be moved forward or rearward at low speed by engaging the main shaft-outer shaft with the main shaft-side sprocket and causing them to rotate integrally in a low-speed traveling mode, the main shaft-side sprocket and the main shaft-outer shaft need to be engaged with a difference of rotational speed of 1500 rpm. This enlarges the shock at the time of engaging of the main shaft-side sprocket and the main shaft-outer shaft, and the shock makes a large noise.

SUMMARY OF THE INVENTION

In view of the foregoing, the present invention aims to provide a vehicle transmission that can reduce the difference of rotational speed when engaging a main shaft-side sprocket and a main shaft-outer shaft, in a low-speed traveling mode.

A vehicle transmission according to the present invention includes: a main shaft, a counter shaft, a main shaft-side sprocket, a counter shaft-side sprocket, a reverse travel chain, a main shaft-inner shaft, a main shaft-outer shaft, a first clutch, and a second clutch.

The main shaft is provided with a train of multiple drive gears, and receives input of rotation from an internal combustion engine. The counter shaft is provided with a train of multiple driven gears meshing with the train of the multiple drive gears, and is arranged parallel to the main shaft. The main shaft-side sprocket is provided on the main shaft so as to be rotatable relative thereto. The counter shaft-side sprocket is provided on the counter shaft so as to be rotatable relative thereto. The reverse travel chain is wound around the main shaft-side sprocket and the counter shaft-side sprocket.

The main shaft-inner shaft constitutes the main shaft, and has the main shaft-side sprocket rotatable relative thereto. The main shaft-outer shaft constitutes the main shaft, is arranged coaxially with and radially outward of the main shaft-inner shaft, and is capable of rotating integrally with the main shaft-side sprocket or separating from the main shaft-side sprocket. The first clutch is connected to one end side of the main shaft-inner shaft, and the second clutch is connected to one end side of the main shaft-outer shaft.

The vehicle transmission according to the present invention has the following characteristic features.

According to a first characteristic feature, the counter shaft-side sprocket is configured to rotate integrally with a driven gear for first gear, which is provided on the counter shaft so as to be rotatable relative thereto. The vehicle transmission further includes a reverse dog clutch as a drive gear, whose one end side is capable of rotating integrally with or separating from the main shaft-side sprocket, and whose other end side is supported by the main shaft-outer shaft so as not to be rotatable relative thereto, as well as a dog clutch for first gear, which is provided on the counter shaft and capable of engaging with the driven gear for first gear. In this case, when the vehicle transmission shifts from first gear to neutral, the reverse dog clutch is engaged with the main shaft-side sprocket, and then engagement between the dog clutch for first gear and the driven gear for first gear is released. In the neutral, the first clutch and the second clutch are disconnected with the reverse dog clutch and the main shaft-side sprocket being engaged.

According to the first characteristic feature of the present invention, in first gear, the driven gear for first gear and the dog clutch for first gear are engaged. Hence, if the engagement is maintained, even when the gear is shifted from first gear to neutral, and the main shaft-inner shaft and the main shaft-outer shaft rotate due to residual oil in the first clutch and the second clutch, torque transmitted in the order of the main shaft-inner shaft, driven gear for first gear, dog clutch for first gear, and counter shaft is transmitted to a wheel through the counter shaft. However, the transmitted torque is not large enough to drive the wheel. Hence, the vehicle is stopped and rotation of the main shaft-side sprocket is stopped, even though connection is established in the order of the driven gear for first gear, counter shaft-side sprocket, reverse travel chain, and main shaft-side sprocket.

When the reverse dog clutch is engaged with the main shaft-side sprocket in this state, the parts can be engaged with a smaller difference of rotational speed, so that noise and shock at the time of the engagement can be reduced. Therefore, in the first characteristic, the reverse dog clutch is engaged with the main shaft-side sprocket, the engagement between the dog clutch for first gear and the driven gear for first gear is released, and then the first clutch and the second clutch may be disconnected.

Thus, since the reverse dog clutch and the main shaft-side sprocket are thus engaged when shifting from first gear to neutral gear in accordance with the first characteristic feature, the reverse dog clutch, which is a shifter, is not activated when shifting from neutral gear to reverse gear. This can prevent noise and shock at the time of shifting in the low-speed traveling mode.

According to a second characteristic feature, a drive gear for second gear is provided on the main shaft-outer shaft, while a driven gear for second gear meshing with the drive gear for second gear is provided on the counter shaft. In this case, the reverse dog clutch transmits drive power of the main shaft-inner shaft from the main shaft-side sprocket to the main shaft-outer shaft. The drive gear for second gear transmits the drive power to the counter shaft through the driven gear for second gear.

According to the second characteristic feature of the present invention, since torque of the main shaft-inner shaft and the main shaft-outer shaft is transmitted in the order of the drive gear for second gear, driven gear for second gear, and counter shaft, speed control appropriate for extremely slow travel in the low-speed traveling mode can be performed, according to the balance between the capacity of the first clutch and the second clutch. That is, the vehicle is allowed to travel smoothly at low speed with less torque, by using second gear.

According to a third characteristic feature, a drive gear for first gear meshing with the driven gear for first gear is arranged adjacent to the main shaft-side sprocket, on the main shaft-inner shaft. Since the drive gear for first gear and the main shaft-side sprocket are arranged adjacent to each other on the main shaft-inner shaft, space for rotation of the drive gear for first gear and driven gear for first gear, as well as for the main shaft-side sprocket, reverse travel chain, and counter shaft-side sprocket can be ensured even in a small space.

According to a fourth characteristic feature, the counter shaft-side sprocket is formed integrally with the driven gear for first gear, and arranged on the counter shaft. Thus, the mechanism for implementing the low-speed traveling mode can be downsized, since the counter shaft-side sprocket and the driven gear for first gear are formed integrally.

BRIEF DESCRIPTION OF THE DRAWINGS

These and further features of the invention will be apparent with reference to the following description and drawings, wherein.

DETAILED DESCRIPTION OF THE INVENTION

Hereinafter, a description will be given with reference to FIGS. 1 to 6, of a preferable embodiment example where a vehicle transmission of the present invention is applied to a motorcycle, which is a vehicle.

Figure 1:
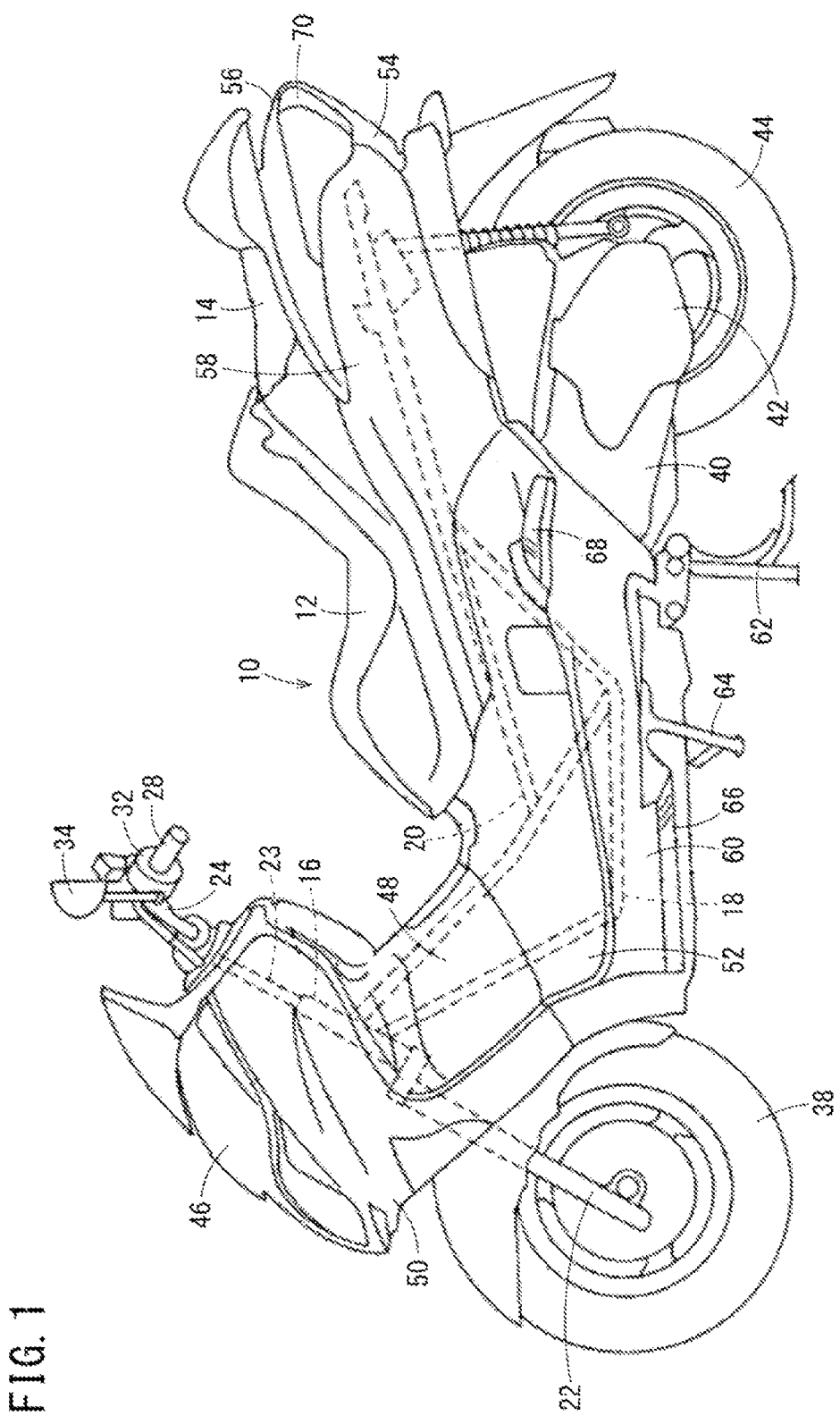
FIG. 1 is a left side view of an example of a motorcycle.
Figure 2:
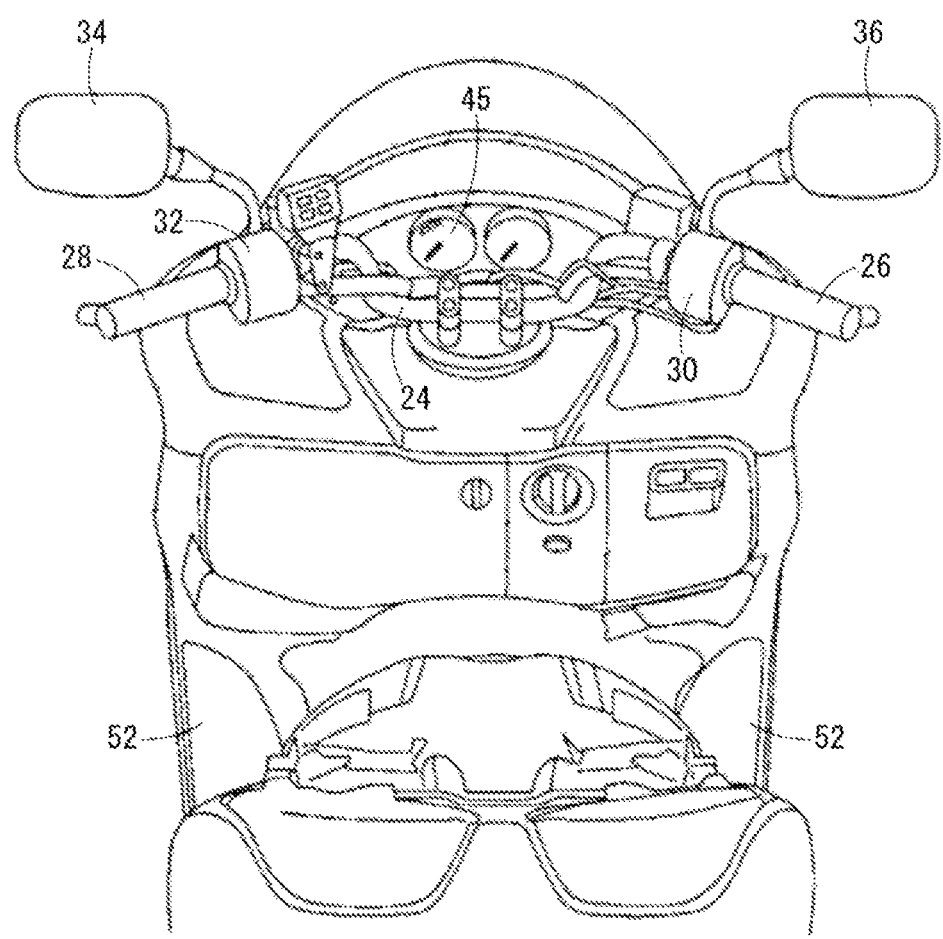
FIG. 2 is a plan view of the periphery of a handle of the motorcycle as seen from above.

As shown in FIGS. 1 and 2, a motorcycle 10 is a tandem vehicle (front-rear two seated vehicle) including a rider's seat 12 and a passenger's seat 14. The rider's seat 12 and the passenger's seat 14 include an unillustrated seat lock that is unlocked by remote control.

A body frame of the motorcycle 10 includes a head pipe 16, a down tube 18 extending in the lower rear direction from the head pipe 16, and a main tube 20 extending further in the rear upper direction from the down tube 18.

A front fork 22 is attached to the head pipe 16, in such a manner as to be steerable by a handle shaft 23. A handle bar 24, which extends to the left and right of the vehicle body, is attached to an upper portion of the handle shaft 23. The handle bar 24 has a right grip 26 provided on a right end portion thereof, and a left grip 28 provided on a left end portion thereof. Additionally, the handle bar 24 has a right switch case 30 arranged adjacent to the right grip 26, and a left switch case 32 arranged adjacent to the left grip 28. Further, a left mirror 34 and a right mirror 36 are attached to the handle bar 24. A front wheel 38 is pivotally supported to the lower end of the front fork 22.

A later-mentioned engine 100 (see FIG. 4) is suspended from the main tube 20, which constitutes the body frame, and output (output torque, driving torque) of the engine 100 is transmitted to a rear wheel 44 as a drive wheel through a transmission 40 and a reducer 42. Note that a gauge 45 and the like are arranged around the handle bar 24.

A vehicle body is covered with a front cover 46, a leg shield 48, a front side cover 50, a floor center cover 52, a rear side cover 54, a rear center cover 56, a body side cover 58, and a floor side cover 60. The vehicle body is capable of supporting itself with a main stand 62 and a side stand 64.

A rider's step 66 is provided in the floor side cover 60 on both sides of the vehicle body. Also, a passenger's step 68 is provided so as to project to the left and right from the main tube 20. A tail lamp unit 70 is provided between the rear center cover 56 and the rear side cover 54. In this case, the tail lamp unit 70 accommodates a position lamp, a stop lamp, a winker lamp, and the like.

Figure 3:
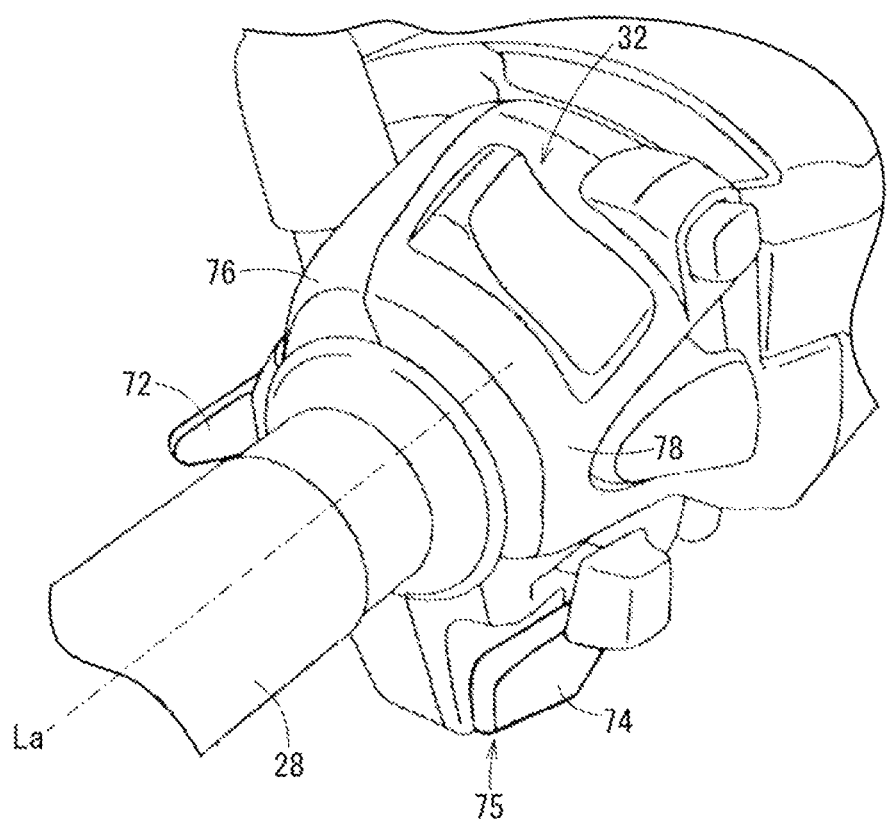
FIG. 3 is a perspective view of a left switch case, in which a shift down switch (forward switch) and a shift up switch (reverse switch) are installed.

In the embodiment, as shown in FIG. 3, a handle switch 75, which has at least a shift up switch 72 and a shift down switch 74, is provided in the left switch case 32.

Specifically, the left switch case 32 includes a two-piece-divided front housing portion 76 and rear housing portion 78, and is attached to the motorcycle 10, such that the front housing portion 76 and the rear housing portion 78 sandwich the vicinity of the left grip 28 of the handle bar 24 from the front and rear. In other words, the front housing portion 76 is installed on the front side and the rear housing portion 78 is installed on the rear side, with an axis La of the handle interposed therebetween. The rear housing portion 78 faces the rider's side.

The shift up switch 72 is installed in the front housing portion 76, and the shift down switch 74 is installed in the rear housing portion 78. That is, the shift up switch 72 is arranged in a position suitable for the rider gripping the left grip 28 with the left hand to operate mainly with the index finger, and the shift down switch 74 is arranged in a position suitable for the rider to operate mainly with the thumb. The shift up switch 72 and the shift down switch 74 are preferably arranged in positions where they are operable by the rider at the same time.

Also in the embodiment, in addition to a normal traveling mode, a low-speed traveling mode can be carried out where the rider walks and pushes the motorcycle 10 forward or rearward to park the vehicle, for example. Here, the low-speed traveling mode refers not to a mode where only reverse travel is possible, but to a mode where reverse travel as well as forward travel is possible.

The vehicle transitions to the low-speed traveling mode when the shift up switch 72 and the shift down switch 74 are operated at the same time, under a predetermined condition (low-speed traveling mode transitioning condition) set in advance.

The vehicle moves forward when the shift down switch 74 is operated during the low-speed traveling mode. Operation of the shift down switch 74 intuitively reminds the rider of forward travel because it is a frontward pushing motion by the thumb, for example, and thus can effectively prevent erroneous operation. Accordingly, the shift down switch 74 is sometimes referred to as a forward switch 74 in the following description.

Similarly, the vehicle moves rearward when the shift up switch 72 is operated during the low-speed traveling mode. Operation of the shift up switch 72 intuitively reminds the rider of reverse travel because it is a rearward pushing motion by the index finger, for example, and thus can effectively prevent erroneous operation. Accordingly, the shift up switch 72 is sometimes referred to as a reverse switch 72 in the following description.

Note that the vehicle transitions to the normal traveling mode when the shift up switch 72 and the shift down switch 74 are operated at the same time, under a predetermined condition (normal traveling mode transitioning condition) set in advance.

In other words, a combination of the shift up switch 72 and the shift down switch 74 constitutes a low-speed traveling mode setting input portion 80 (see FIG. 4), which allows the motorcycle 10 to be driven reversely.

Figure 4:
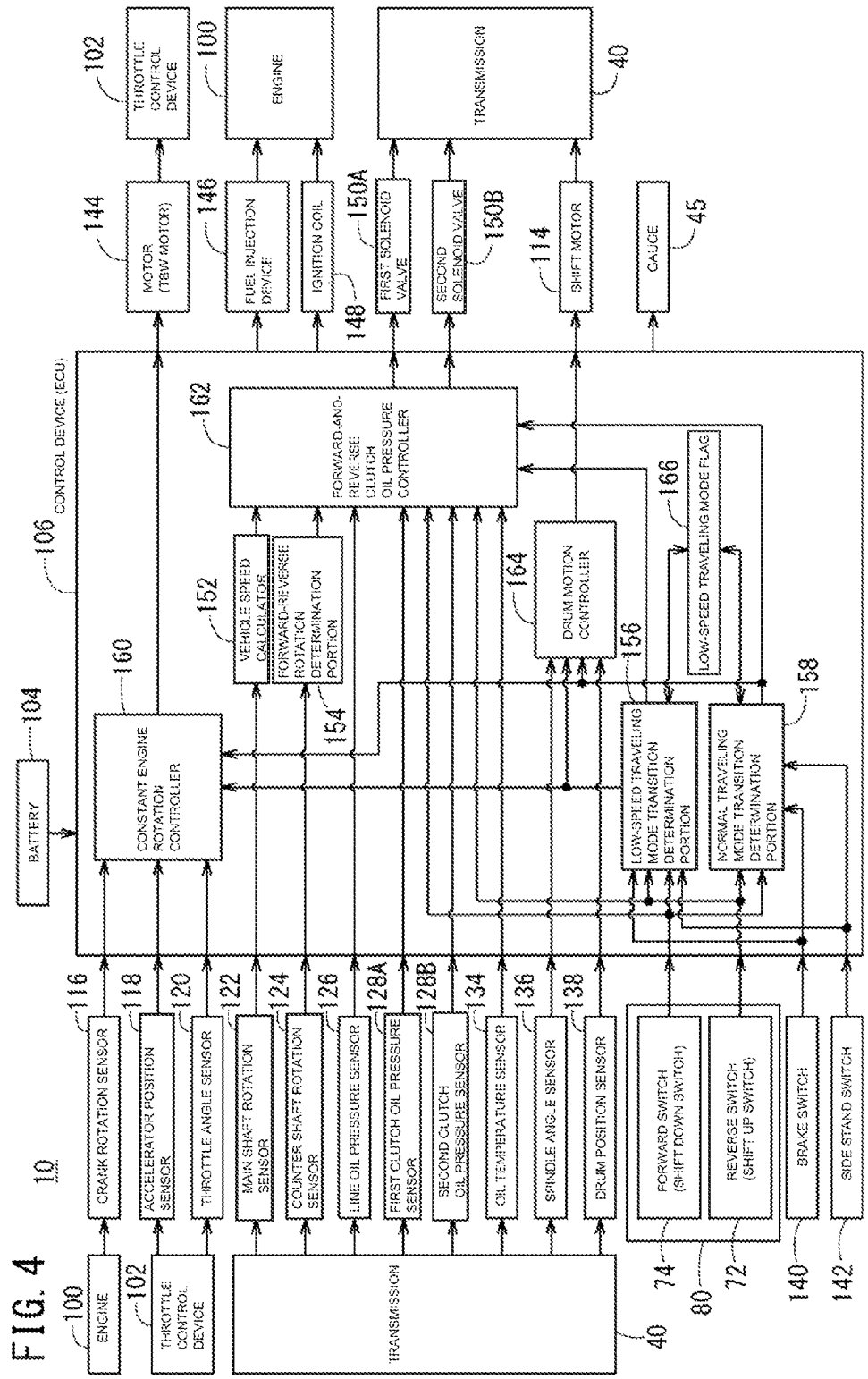
FIG. 4 is a block diagram of a main part of a control system, of a motorcycle including a control device.
Figure 5:
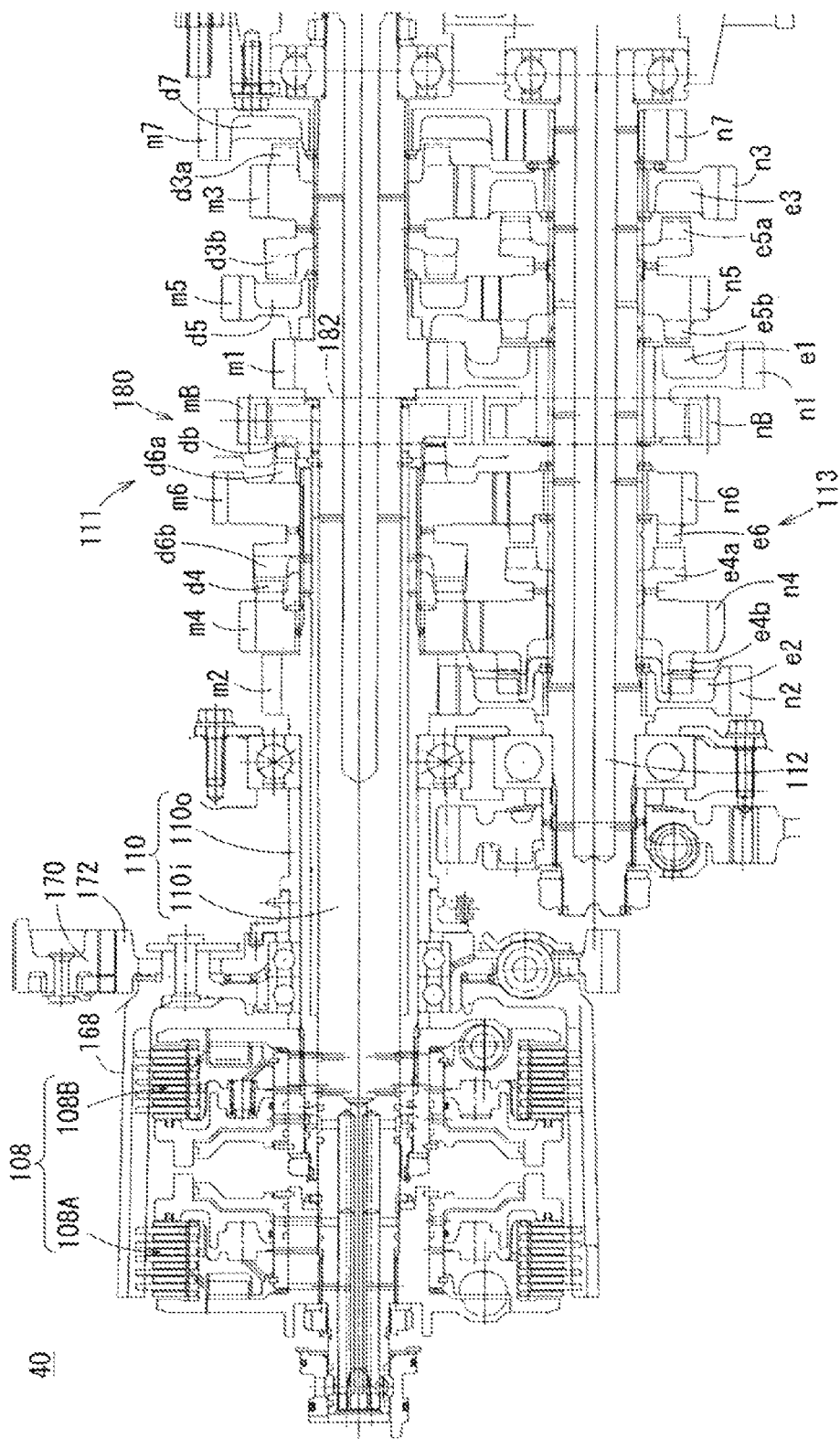
FIG. 5 is a configuration diagram of a drivetrain of a transmission according to the embodiment.
Figure 6:
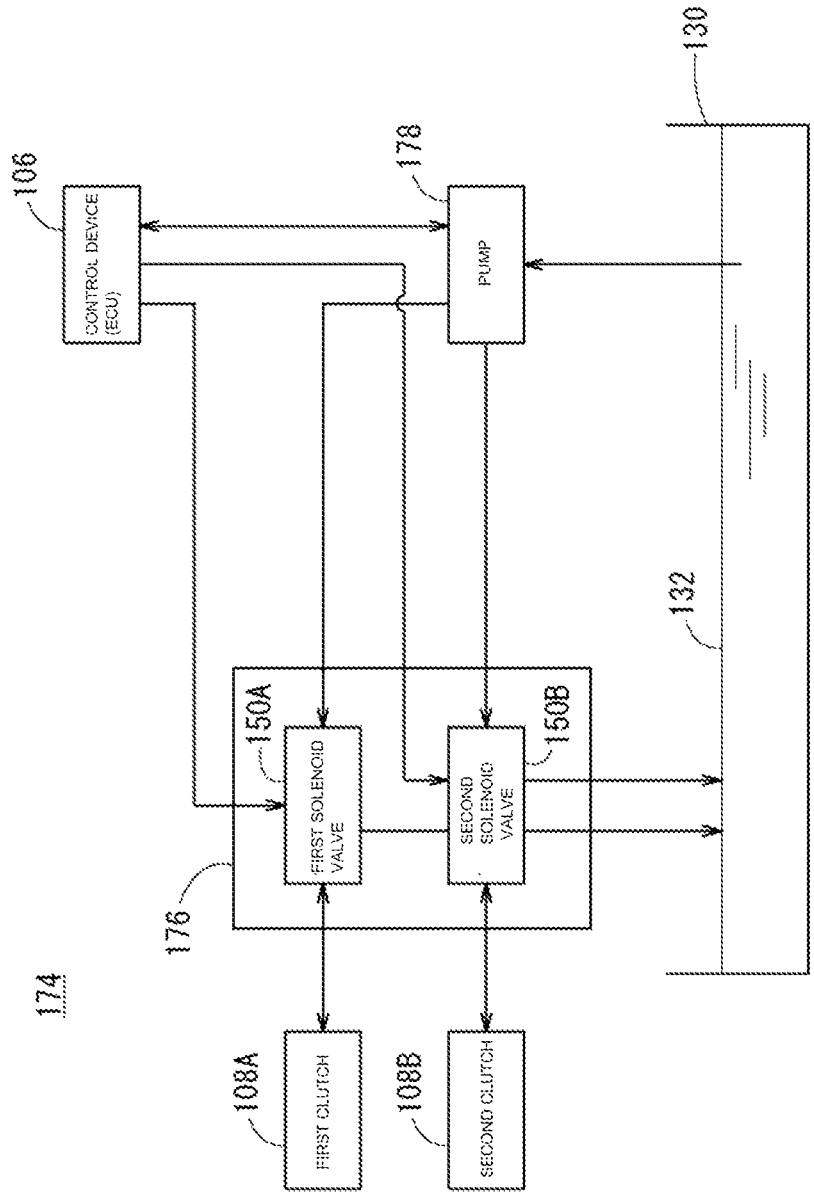
FIG. 6 is a block diagram of a configuration of an oil pressure-application system.

Here, a description is given mainly of the low-speed traveling mode with reference to FIGS. 4 to 6.

FIG. 4 is a block diagram of a main part of a control system, of the motorcycle 10 including a control device 106.

Firstly, the motorcycle 10 has the engine 100 rotating a crankshaft, a throttle control device 102 (throttle by wire: TBW) electronically controlling a throttle, a transmission 40 of the embodiment transmitting output torque of the crankshaft to a drive shaft, and the control device 106 (ECU) controlling the motorcycle 10 by receiving electric power from a battery 104.

As shown in FIG. 5, the transmission 40 of the embodiment has a clutch device 108. A hydraulic dual clutch device (DCT) having a first clutch 108A and a second clutch 108B is preferably employed as the clutch device 108, for example. Details thereof will be described later.

In addition, the transmission 40 has a main shaft 110 and counter shaft 112 arranged parallel to the crankshaft, an unillustrated shift spindle rotated by a shift motor 114 (see FIG. 4), and an unillustrated shift drum that links drive force, by selectively dog-engaging transmission gears according to the rotation angle of the shift spindle. Although the counter shaft 112 normally rotates in one direction (rotation for forward travel), it also rotates reversely (rotation for reverse travel) in this embodiment. Details will be described later.

A drive gear train 111 configured of drive gears m1 to m7 for seven speeds, for example, is provided on the main shaft 110, and a driven gear train 113 configured of driven gears n1 to n7 for seven speeds is provided on the counter shaft 112. Corresponding speeds of the drive gears m1 to m7 and driven gears n1 to n7 mesh with each other, and each constitutes a transmission gear pair corresponding to each speed.

As shown in FIG. 4, various sensors are attached to the aforementioned engine 100, throttle control device 102, and transmission 40.

For example, a crank rotation sensor 116 for detecting the revolution speed of the crankshaft is attached to the engine 100, while an accelerator position sensor 118 for detecting a throttle rotation angle (accelerator position) of the right grip 26, and a throttle angle sensor 120 for detecting an opening angle (throttle opening angle) of a throttle valve of the engine 100 are attached to the throttle control device 102.

The transmission 40 has a main shaft rotation sensor 122 and counter shaft rotation sensor 124 for detecting the revolution speed of the main shaft 110 and counter shaft 112, a line oil pressure sensor 126 for detecting oil pressure of a hydraulic pathway to the clutch device 108, a first clutch oil pressure sensor 128A for detecting oil pressure of the first clutch 108A, a second clutch oil pressure sensor 128B for detecting oil pressure of the second clutch 108B, an oil temperature sensor 134 for detecting the temperature of oil 132 inside an oil pan 130 (see FIG. 6), a spindle angle sensor 136 for detecting the rotation angle of the shift spindle, and a drum position sensor 138 for detecting the position of the shift drum.

Detection signals of the aforementioned various sensors are inputted to the control device 106. In addition to these detection signals, the control device 106 receives input of signals from the shift up switch 72, the shift down switch 74, a brake switch 140, and a side stand switch 142.

For example, each of the shift up switch 72 and the shift down switch 74 outputs an ON signal while the switch is being operated, and outputs an OFF signal when it is not operated. The brake switch 140 also outputs an ON signal while a brake lever is being operated, and outputs an OFF signal when it is not operated. The side stand switch 142 outputs an ON signal while the side stand 64 (see FIG. 1) is brought out, for example, and outputs an OFF signal when the side stand is retracted.

Based on detection signals from various sensors and signals from various switches, the control device 106 controls a motor 144 (TBW motor) of the throttle control device 102, a fuel injection device 146 and ignition coil 148 of the engine 100, the shift motor 114 of the transmission 40, a first solenoid valve 150A for controlling oil pressure of the first clutch 108A, and a second solenoid valve 150B for controlling oil pressure of the second clutch 108B. Furthermore, the control device 106 outputs the result of calculation performed therein, to the gauge 45. The gauge 45 outputs the inputted calculation result in analogue display (display with an indicator needle), digital display, lamp display, and the like.

Moreover, the control device 106 has a determination portion and a controller for achieving the aforementioned low-speed traveling mode.

To be specific, the control device has a vehicle speed calculator 152, a forward-reverse rotation determination portion 154, a low-speed traveling mode transition determination portion 156, a normal traveling mode transition determination portion 158, a constant engine rotation controller 160, a forward-and-reverse clutch oil pressure controller 162, a drum motion controller 164, and the like.

The vehicle speed calculator 152 calculates vehicle speed on the basis of a detection signal from the main shaft rotation sensor 122. The forward-reverse rotation determination portion 154 determines whether the vehicle is moving forward or rearward, on the basis of a detection signal from the counter shaft rotation sensor 124.

The low-speed traveling mode transition determination portion 156 determines whether or not to transition to the low-speed traveling mode, on the basis of signals from various sensors and switches. In a case where the vehicle transitions to the low-speed traveling mode, a low-speed traveling mode flag 166 is set to "1," for example. The normal traveling mode transition determination portion 158 determines whether or not to transition to the normal traveling mode, on the basis of signals from various sensors and switches. In a case where the vehicle transitions to the normal traveling mode, the "1" in the low-speed traveling mode flag 166 is reset to "0."

The constant engine rotation controller 160 disables the rider's operation of the throttle of the right grip 26, and performs control to keep the engine speed and throttle opening angle constant. For instance, the constant engine rotation controller performs control to maintain an idle state.

The forward-and-reverse clutch oil pressure controller 162 functions as a controller for controlling connection and disconnection of the first clutch 108A and the second clutch 108B, and performs brake control for stopping, clutch oil pressure control for forward travel, as well as clutch oil pressure control for reverse travel, on the basis of vehicle speed information from the vehicle speed calculator 152, a determination result from the forward-reverse rotation determination portion 154, and detection signals from the oil pressure sensors (126, 128A, 128B) and oil temperature sensor 134.

The drum motion controller 164 drives the shift motor 114, so that the position of the shift drum is moved to a preset low-speed traveling mode position when transitioning to the low-speed traveling mode from the normal traveling mode. The drum motion controller also drives the shift motor 114, so that the position of the shift drum is moved to a neutral position when transitioning to the normal traveling mode from the low-speed traveling mode. Feedback control is performed on the movement of the shift motor 114, according to detection signals from the spindle angle sensor 136 and the drum position sensor 138.

Here, a configuration and operation of the clutch device 108, main shaft 110, and counter shaft 112 of the transmission 40 will be described with reference to FIG. 5.

The clutch device 108 has a hydraulic odd step-side disc clutch (first clutch 108A) and even step-side disc clutch (second clutch 108B), which are arranged coaxially and adjacent to each other. The main shaft 110 has an inner shaft (main shaft-inner shaft) 110$i$ and an outer shaft (main shaft-outer shaft) 110$o$, and the inner shaft 110$i$ and the outer shaft 110$o$ are provided coaxially. The first clutch 108A is provided on one end portion of the inner shaft 110$i$, and the second clutch 108B is provided on one end portion of the outer shaft 110$o$.

A main-side driven gear 172 that meshes with a crank-side drive gear 170 of the crankshaft is provided coaxially on a clutch outer 168, which is shared by the first clutch 108A and the second clutch 108B. Rotary drive force (output torque, driving torque) from the crankshaft is inputted to the clutch outer 168 through the crank-side drive gear 170 and the main-side driven gear 172. The rotary drive force inputted to the clutch outer 168 is transmitted to each of the inner shaft 110$i$ and the outer shaft 110$o$ as output torque (driving torque) from the engine 100, depending on the connection state of the first clutch 108A and the second clutch 108B.

The connection state of the first clutch 108A and the second clutch 108B is controlled separately, according to whether or not oil pressure is applied by an oil pressure-application system 174 shown in FIG. 6.

As shown in FIG. 6, the oil pressure-application system 174 has a clutch control device 176, and an oil pump 178 that sucks up and feeds the oil 132 in the oil pan 130 to the clutch device 108. The clutch control device 176 has the first solenoid valve 150A and the second solenoid valve 150B.

The first solenoid valve 150A controls oil pressure applied to the first clutch 108A, on the basis of an instruction from the control device 106. That is, application of oil pressure to the first clutch 108A connects the inner shaft 110$i$ of the main shaft 110 and the crankshaft. In contrast, reduction in oil pressure applied to the first clutch 108A disconnects the inner shaft and the crankshaft.

The second solenoid valve 150B controls oil pressure applied to the second clutch 108B, on the basis of an instruction from the control device 106. That is, application of oil pressure to the second clutch 108B connects the outer shaft 110$o$ of the main shaft 110 and the crankshaft. In contrast, reduction in oil pressure applied to the second clutch 108B disconnects the outer shaft and the crankshaft.

Normally, of the first clutch 108A and the second clutch 108B, one is connected while the other is disconnected. One of the transmission gear pairs connected to the inner shaft 110$i$ and the outer shaft 110$o$ is used for power transmission inside the transmission 40. The next transmission gear pair to be used is selected from among those connected to the inner shaft 110$i$ and the outer shaft 110$o$, according to an operation of the shift up switch 72 or the shift down switch 74. With this selection, one of the first clutch 108A and second clutch 108B that had been connected is disconnected, and the other clutch that had been disconnected is connected. Thus, power transmission of the transmission 40 is switched to that using the selected transmission gear pair, so that the transmission 40 can be upshifted or downshifted.

To be specific, the first clutch 108A is connected in first gear, third gear, fifth gear, and seventh gear, while the second clutch 108B is connected in second gear, fourth gear, and sixth gear. In other words, in the clutch device 108, the first clutch 108A and the second clutch 108B are alternately connected and disconnected for each step to shift from first to seventh gear.

As shown in FIG. 5, the transmission 40 is a constant-mesh type transmission, where the drive gears m1 to m7 and driven gears n1 to n7 corresponding to the respective speeds are constantly meshed with each other.

The gears m1 to m7 and n1 to n7 are classified broadly into: a fixed gear capable of rotating integrally with its supporting shaft (main shaft 110, counter shaft 112); a free gear capable of rotating relative to the supporting shaft but incapable of moving in the axial direction; and a slide gear capable of rotating integrally with the supporting shaft and also capable of moving in the axial direction.

Specifically, the drive gears m1 and m2 are fixed gears, drive gears m3 and m6 are slide gears, and drive gears m4, m5 and m7 are free gears.

Additionally, the driven gear n7 is a fixed gear, driven gears n1 to n3 and n6 are free gears, and driven gears n4 and n5 are slide gears.

Note that each slide gear is spline-fitted to its supporting shaft.

To be specific, the gears on the inner shaft 110i are arranged in the order of the fixed gear m1 as a drive gear for first gear, free gear m5, slide gear m3, and free gear m7, from the side close to the clutch device 108 to the side away from the clutch device, while on the counter shaft 112, the free gear n1 as a driven gear for first gear, slide gear n5 as a dog clutch for first gear, free gear n3, and fixed gear n7 are arranged so as to correspond to the above-mentioned gears.

The gears on the outer shaft 110o are arranged in the order of the fixed gear m2 as a drive gear for second gear, free gear m4, and slide gear m6 as a reverse dog clutch, from the side close to the clutch device 108 to the side away from the clutch device, while on the counter shaft 112, the free gear n2 as a driven gear for second gear, slide gear n4, and free gear n6 are arranged so as to correspond to the above-mentioned gears.

That is, the free gear on the counter shaft 112 meshes with the fixed or slide gear on the main shaft 110, while the slide or fixed gear of the counter shaft 112 meshes with the free gear on the main shaft 110.

Axially protruding dogs d3a and d3b are provided on both side faces of the drive gear m3. When the drive gear m3 slides in one axial direction (right side in FIG. 5: hereinafter referred to as the right side in the axial direction) from the neutral position, one dog d3a engages with a dog hole d7 in the drive gear m7. Similarly, when the drive gear m3 slides in the other axial direction (right side in FIG. 5: hereinafter referred to as the left side in the axial direction) from the neutral position, the other dog d3b engages with a dog hole d5 in the drive gear m5.

An axially protruding dog d4 is provided on one side face of the drive gear m4. Axially protruding dogs d6a and d6b are also provided on both side faces of the drive gear m6. When the drive gear m6 slides to the left side in the axial direction from the neutral position, the other dog d6b engages with the dog d4 on the drive gear m4.

Axially protruding dogs e5a and e5b are provided on both side faces of the driven gear n5. When the driven gear n5 slides to the right side in the axial direction from the neutral position, one dog e5a engages with a dog hole e3 in the driven gear n3. Similarly, when the driven gear n5 slides to the left side in the axial direction from the neutral position, the other dog e5b engages with a dog hole e1 in the driven gear n1.

An axially protruding dog e6 is provided on another side face of the driven gear n6. Axially protruding dogs e4a and e4b are also provided on both side faces of the driven gear n4. When the driven gear n4 slides to the right side in the axial direction from the neutral position, one dog e4a engages with the dog e6 on the driven gear n6. Similarly, when the driven gear n4 slides to the left side in the axial direction from the neutral position, the other dog e4b engages with a dog hole e2 in the driven gear n2.

Next, a description will be given of upshifting from first to seven gears from the neutral state, in the normal traveling mode where the inner shaft 110i is rotated by the first clutch 108A, for example. Every upshifting operation in the normal traveling mode is performed with the counter shaft 112 rotating in a direction opposite to the rotation direction of the main shaft 110, i.e., rotating in the normal direction. Rotary force of the normal rotation is transmitted to the unillustrated drive shaft, and moves the motorcycle 10 forward.

When the rotation angle of the shift spindle indicates the neutral state, each of the drive gears m3, m6 and the driven gears n4, n5 are in the neutral position, so that rotary force of the main shaft 110 is not transmitted to the counter shaft 112.

When the rotation angle of the shift spindle is changed from the neutral state to first gear, the driven gear n5 moves to the left side in the axial direction. With this, rotary force (output torque, driving torque) of the inner shaft 110i is transmitted to the counter shaft 112 through the drive gear m1, driven gear n1, and driven gear n5 in this order.

When the rotation angle of the shift spindle is changed from first gear to second gear, the first clutch 108A is disconnected to switch to the second clutch 108B for rotation of the outer shaft 110o, and the driven gear n4 moves to the left side in the axial direction. With this, rotary force (output torque, driving torque) of the outer shaft 110o is transmitted to the counter shaft 112 through the drive gear m2, driven gear n2, and driven gear n4 in this order.

When the rotation angle of the shift spindle is changed from second gear to third gear, the second clutch 108B is disconnected to switch to the first clutch 108A for rotation of the inner shaft 110i, and the driven gear n5 moves to the right side in the axial direction. With this, rotary force of the inner shaft 110i is transmitted to the counter shaft 112 through the drive gear m3, driven gear n3, and driven gear n5 in this order.

When the rotation angle of the shift spindle is changed from third gear to fourth gear, the first clutch 108A is disconnected to switch to the second clutch 108B for rotation of the outer shaft 110o, and the drive gear m6 moves to the left side in the axial direction. With this, rotary force of the outer shaft 110o is transmitted to the counter shaft 112 through the drive gear m6, drive gear m4, and driven gear n4 in this order.

When the rotation angle of the shift spindle is changed from fourth gear to fifth gear, the second clutch 108B is disconnected to switch to the first clutch 108A for rotation of the inner shaft 110i, and the drive gear m3 moves to the left side in the axial direction. With this, rotary force of the inner shaft 110i is transmitted to the counter shaft 112 through the drive gear m3, drive gear m5, and driven gear n5 in this order.

When the rotation angle of the shift spindle is changed from fifth gear to sixth gear, the first clutch 108A is disconnected to switch to the second clutch 108B for rotation of the outer shaft 110o, and the drive gear m6 returns to the neutral position while the driven gear n4 moves to the right side in the axial direction. With this, rotary force of the outer shaft 110o is transmitted to the counter shaft 112 through the drive gear m6, driven gear n6, and driven gear n4 in this order.

When the rotation angle of the shift spindle is changed from sixth gear to seventh gear, the second clutch 108B is disconnected to switch to the first clutch 108A for rotation of the inner shaft 110i, and the drive gear m3 moves to the right side in the axial direction. With this, rotary force of the inner shaft 110i is transmitted to the counter shaft 112 through the drive gear m3, drive gear m7, and driven gear n7 in this order.

Since downshifting operations are opposite to the above-mentioned upshifting operations, descriptions thereof are omitted. Note that every downshifting operation is also performed with the counter shaft 112 rotating in the normal direction.

Moreover, the embodiment includes a reverse gear train 180 for performing reverse travel. The reverse gear train 180 has a main shaft-side sprocket mB, which is a sprocket on the main shaft 110 side installed between the drive gear m1 of the inner shaft 110*i* and the drive gear m6 of the outer shaft 110*o*, and a counter shaft-side sprocket nB, which is a sprocket on the counter shaft 112 side installed between the driven gears n1 and n6 of the counter shaft 112. The main shaft-side sprocket mB is a free gear, while the counter shaft-side sprocket nB is a free gear provided integrally with the driven gear n1 and rotating with the driven gear n1. The main shaft-side sprocket mB and the counter shaft-side sprocket nB are rotated in the same direction by a reverse travel chain 182.

Further, when the rotation angle of the shift spindle is changed to a preset angle corresponding to the low-speed traveling mode, the position of the shift drum is set to a preset low-speed traveling mode position, the drive gear m6 slides to the right side in the axial direction from the neutral position, and the driven gear n4 slides to the left side in the axial direction from the neutral position. With this, one dog d6*a* on the drive gear m6 engages with a dog hole db in the main shaft-side sprocket mB, and the other dog e4*b* on the driven gear n4 engages with the dog hole e2 in the driven gear n2.

After transitioning to the low-speed traveling mode, a forward movement in the low-speed traveling mode is carried out by operating the forward switch 74. That is, the second clutch 108B is connected, and the first clutch 108A is disconnected. With this, rotary force of the crankshaft in the idle state is transmitted to the outer shaft 110*o* through the second clutch 108B. Accordingly, rotary force of the outer shaft 110*o* is transmitted to the counter shaft 112 through the drive gear m2, driven gear n2, and driven gear n4 in this order, and the counter shaft 112 rotates in the normal direction. Rotary force of the normal rotation is transmitted to the drive shaft and moves the motorcycle 10 forward. Note that although rotary force of the outer shaft 110*o* is transmitted to the inner shaft 110*i* through the drive gear m6, main shaft-side sprocket mB, reverse travel chain 182, counter shaft-side sprocket nB, driven gear n1, and drive gear m1 in this order, the inner shaft 110*i* only spins free since the odd gears are in the neutral state.

After transitioning to the low-speed traveling mode, a rearward movement in the low-speed traveling mode is carried out by operating the reverse switch 72. That is, the first clutch 108A is connected, and the second clutch 108B is disconnected. With this, rotary force of the crankshaft in the idle state is transmitted to the inner shaft 110*i* through the first clutch 108A. Accordingly, rotary force of the inner shaft 110*i* is transmitted to the outer shaft 110*o* through the drive gear m1, driven gear n1, counter shaft-side sprocket nB, reverse travel chain 182, main shaft-side sprocket mB, and drive gear m6 in this order. In this case, the outer shaft 110*o* rotates in a direction opposite to the rotation direction of the inner shaft 110*i*. Then, rotary force of the outer shaft 110*o* is transmitted to the counter shaft 112 through the drive gear m2, driven gear n2, and driven gear n4 in this order. In this case, the counter shaft 112 rotates in a direction opposite to the rotation direction of the outer shaft 110*o* (the same direction as the rotation of the inner shaft 110*i*), i.e., rotates in the reverse direction. Rotary force of the reverse rotation is transmitted to the drive shaft and moves the motorcycle 10 rearward.

In the transmission 40, the motorcycle 10 cannot move forward or rearward if it is in the neutral state, i.e., if the first clutch 108A and the second clutch 108B are disconnected. However, since there is residual oil in the first clutch 108A and the second clutch 108B, clutch capacity is generated by the residual oil even when the first clutch 108A and the second clutch 108B are disconnected. Hence, the first clutch 108A and the second clutch 108B are connected spuriously, so that the inner shaft 110*i* and the outer shaft 110*o* may be rotated slightly by an output-side plate.

Here, a description will be given of the problem of the transmission 40, in a case where each of the inner shaft 110*i* and the outer shaft 110*o* rotates via residual oil at 1000 rpm, for example, due to the spurious connection between the first clutch 108A and the second clutch 108B.

In this case, rotation of the inner shaft 110*i* is transmitted in the order of: the inner shaft 110*i*, drive gear m1 for first gear, driven gear n1, counter shaft-side sprocket nB, reverse travel chain 182, and main shaft-side sprocket mB. If the gear ratio between the drive gear m1 and the driven gear n1 is 2, and the gear ratio between the counter shaft-side sprocket nB and the main shaft-side sprocket mB is 1, the main shaft-side sprocket mB rotates at 500 rpm in the opposite direction of the inner shaft 110*i* and outer shaft 110*o* (−500 rpm).

That is, the difference of rotational speed between the main shaft-side sprocket mB, and the inner shaft 110*i* and outer shaft 110*o* is 1500 rpm (1000 rpm−(−500 rpm)=1500 rpm).

Meanwhile, the drive gear m6 rotates integrally with the outer shaft 110*o* at 1000 rpm. Accordingly, if the motorcycle 10 is to be moved rearward by engaging the dog d6*a* on the drive gear m6 with the dog hole db in the main shaft-side sprocket mB, the dog d6*a* needs to be engaged with the dog hole db with a difference of rotational speed of 1500 rpm. This enlarges the shock at the time of engaging of the main shaft-side sprocket mB and the drive gear m6, and the shock makes a large noise.

Hence, in the embodiment, the transmission 40 is configured and operates in the following manner, to reduce the difference of rotational speed when engaging the main shaft-side sprocket mB and the drive gear m6 to shift through first gear, neutral gear, and reverse gear in a low-speed traveling mode.

Specifically, in the transmission 40, the counter shaft-side sprocket nB is formed integrally with and configured to be integrally rotatable with the driven gear n1 for first gear, which is provided on the counter shaft 112 so as to be rotatable relative thereto. The driven gear n5, which is capable of engaging with the driven gear n1 and rotates integrally with the counter shaft 112, is also provided on the counter shaft 112.

Meanwhile, the drive gear m6 can either have the dog d6*a* on one end side engage with the dog hole db in the main shaft-side sprocket mB to rotate integrally therewith, or separate from the main shaft-side sprocket mB. The drive gear m6 also rotates integrally with the outer shaft 110*o*. In other words, the drive gear m6 is supported by the outer shaft 110*o*, so as not to be rotatable relative thereto.

When the transmission 40 shifts from first gear to neutral gear in the embodiment, firstly, the drive gear m6 and the main shaft-side sprocket mB are engaged by engaging the dog d6*a* on the drive gear m6 with the dog hole db. Next, the engagement between the driven gear n5 and the driven gear n1 is released, by releasing the engagement between the dog e5*b* on the driven gear n5 and the dog hole e1 in the driven gear n1. Then, the first clutch 108A and the second clutch 108B are disconnected with the drive gear m6 and the main shaft-side sprocket mB being engaged.

Next, when shifting from neutral gear to reverse gear, the dog e4*b* on the driven gear n4 and the dog hole e2 in the driven gear n2 are engaged in the transmission 40.

Thus, in the embodiment, the engagement between the driven gear n1 for first gear and the driven gear n5 is maintained, when stopping the motorcycle 10 and shifting from first gear to neutral gear. With this, even if the inner shaft 110i and the outer shaft 110o rotate due to residual oil in the first clutch 108A and the second clutch 108B, drive torque transmitted in the order of the inner shaft 110i, drive gear m1, driven gear n1, driven gear n5, and counter shaft 112 is transmitted to the rear wheel 44 through the counter shaft 112 and the drive shaft. However, the transmitted drive torque is not large enough to drive the rear wheel 44. Hence, the motorcycle 10 is stopped and rotation of the main shaft-side sprocket mB is stopped, even though connection is established in the order of the driven gear n1, counter shaft-side sprocket nB, reverse travel chain 182, and main shaft-side sprocket mB.

When the dog d6a on the drive gear m6 is engaged with the dog hole db in the main shaft-side sprocket mB in this state, the drive gear m6 rotating integrally with the outer shaft 110o and the main shaft-side sprocket mB can be engaged with a small difference of rotational speed. This can reduce noise and shock at the time of the engagement. For example, if the outer shaft 110o and the drive gear m6 are rotating at 1000 rpm, the drive gear m6 and the main shaft-side sprocket mB can be engaged with a smaller difference of rotational speed of 1000 rpm, as compared to the difference of rotational speed of 1500 rpm exemplified in [Problem to Be Solved by the Invention].

Therefore, in the embodiment, the gear can be shifted from first to neutral, by engaging the drive gear m6 and the main shaft-side sprocket mB, releasing the engagement between the driven gear n1 for first gear and the driven gear n5, and disconnecting the first clutch 108A and the second clutch 108B.

Since the drive gear m6 and the main shaft-side sprocket mB are thus engaged by shifting from first gear to neutral gear, the drive gear m6, which is a shifter, is not activated when shifting from neutral gear to reverse gear (reverse travel). This can prevent noise and shock at the time of shifting in the low-speed traveling mode.

Also in the embodiment, the drive gear m2 for second gear is provided on the outer shaft 110o, and the driven gear n2 for second gear that meshes with the drive gear m2 is provided on the counter shaft 112. In this case, the drive gear m6 transmits drive power of the inner shaft 110i from the main shaft-side sprocket mB, to the outer shaft 110o. With this, the drive gear m2 rotating integrally with the outer shaft 110o transmits the drive power to the counter shaft 112, through the driven gear n2 and the driven gear n4.

Thus, since drive torque of the inner shaft 110i and the outer shaft 110o is transmitted in the order of the drive gear m2 for second gear, driven gear n2 for second gear, driven gear n4, and counter shaft 112, speed control appropriate for extremely slow travel in the low-speed traveling mode can be performed, according to the balance between the capacity of the first clutch 108A and the second clutch 108B. That is, the motorcycle 10 is allowed to travel smoothly at low speed with less torque, by using second gear.

Moreover, in the embodiment, the drive gear m1 for first gear and the main shaft-side sprocket mB are arranged adjacent to each other on the inner shaft 110i. Hence, space for rotation of the drive gear m1 for first gear and driven gear n1, as well as for the main shaft-side sprocket mB, reverse travel chain 182, and counter shaft-side sprocket nB can be ensured even in a small space.

Further, according to the embodiment, the mechanism for implementing the low-speed traveling mode can be downsized, since the counter shaft-side sprocket nB and the driven gear n1 for first gear are formed integrally.

Note that the vehicle transmission according to the present invention is not limited to the above embodiment, and can be configured in various ways without departing from the gist of the invention.

| DESCRIPTION OF REFERENCE NUMERALS | | | |
|---|---|---|---|
| 10 | motorcycle (vehicle) | 32 | left switch case |
| 40 | transmission (vehicle transmission) | 44 | rear wheel |
| 72 | shift up switch | 74 | shift down switch |
| 75 | handle switch | 100 | engine (internal combustion engine) |
| 106 | control device | 108 | clutch device |
| 108A | first clutch | 108B | second clutch |
| 110 | main shaft | | |
| 110i | inner shaft (main shaft-inner shaft) | | |
| 110o | outer shaft (main shaft-outer shaft) | 111 | drive gear train |
| 112 | counter shaft | | |
| 113 | driven gear train | 132 | oil |
| 150A | first solenoid valve | 150B | second solenoid valve |
| 162 | forward-and-reverse clutch oil pressure controller | | |
| 174 | oil pressure-application system | | |
| 176 | clutch control device | 180 | reverse gear train |
| 182 | reverse travel chain | m1 to m5, m7 | drive gear |
| m6 | drive gear (reverse dog clutch) | | |
| mB | main shaft-side sprocket | n1 to n4, n6, n7 | driven gear |
| n5 | driven gear (dog clutch for first gear) | nB | counter shaft-side sprocket |

What is claimed is:

1. A vehicle transmission comprising:

a main shaft provided with a train of a plurality of drive gears, and receiving input of rotation from an internal combustion engine;

a counter shaft provided with a train of a plurality of driven gears meshing with the train of said plurality of drive gears, and arranged parallel to said main shaft;

a main shaft-side sprocket provided on said main shaft so as to be rotatable relative thereto;

a counter shaft-side sprocket provided on said counter shaft so as to be rotatable relative thereto;

a reverse travel chain wound around said main shaft-side sprocket and said counter shaft-side sprocket;

a main shaft-inner shaft constituting said main shaft, and having said main shaft-side sprocket rotatable relative thereto;

a main shaft-outer shaft constituting said main shaft, arranged coaxially with and radially outward of said main shaft-inner shaft, and capable of rotating integrally with said main shaft-side sprocket or separating from said main shaft-side sprocket;

a first clutch connected to one end side of said main shaft-inner shaft; and a second clutch connected to one end side of said main shaft-outer shaft, wherein:

said counter shaft-side sprocket is configured to rotate integrally with a driven gear for first gear, which is provided on said counter shaft so as to be rotatable relative thereto;

said vehicle transmission further comprises a reverse dog clutch as a drive gear, whose one end side is capable of rotating integrally with or separating from said main shaft-side sprocket, and whose other end side is supported by said main shaft-outer shaft so as not to be rotatable relative thereto, and a dog clutch for first gear, which is provided on said counter shaft and capable of engaging with said driven gear for first gear;

when said vehicle transmission shifts from first gear to neutral, said reverse dog clutch is engaged with said main shaft-side sprocket, and then engagement between said dog clutch for first gear and said driven gear for first gear is released; and in said neutral, said first clutch and said second clutch are disconnected with said reverse dog clutch and said main shaft-side sprocket being engaged.

2. The vehicle transmission according to claim 1, wherein:

a drive gear for second gear is provided on said main shaft-outer shaft, while a driven gear for second gear meshing with said drive gear for second gear is provided on said counter shaft;

said reverse dog clutch transmits drive power of said main shaft-inner shaft from said main shaft-side sprocket to said main shaft-outer shaft; and said drive gear for second gear transmits said drive power to said counter shaft through said driven gear for second gear.

3. The vehicle transmission according claim 2, wherein a drive gear for first gear meshing with said driven gear for first gear is arranged adjacent to said main shaft-side sprocket, on said main shaft-inner shaft.

4. The vehicle transmission according to claim 3, wherein said counter shaft-side sprocket is formed integrally with said driven gear for first gear, and arranged on said counter shaft.

5. The vehicle transmission according to claim 2, wherein said counter shaft-side sprocket is formed integrally with said driven gear for first gear, and arranged on said counter shaft.

6. The vehicle transmission according claim 1, wherein a drive gear for first gear meshing with said driven gear for first gear is arranged adjacent to said main shaft-side sprocket, on said main shaft-inner shaft.

7. The vehicle transmission according to claim 6, wherein said counter shaft-side sprocket is formed integrally with said driven gear for first gear, and arranged on said counter shaft.

8. The vehicle transmission according to claim 1, wherein said counter shaft-side sprocket is formed integrally with said driven gear for first gear, and arranged on said counter shaft.

* * * * *